United States Patent
Tsengas

(10) Patent No.: US 7,410,662 B1
(45) Date of Patent: Aug. 12, 2008

(54) APPARATUS AND METHOD OF MAKING CANINE CHEW TOY

(75) Inventor: Steven Tsengas, Fairport Harbor, OH (US)

(73) Assignee: Ourpet's Company, Fairport Harbor, OH (US)

( * ) Notice: Subject to any disclaimer, the term of this patent is extended or adjusted under 35 U.S.C. 154(b) by 276 days.

(21) Appl. No.: 11/009,165

(22) Filed: Dec. 10, 2004

Related U.S. Application Data

(60) Provisional application No. 60/528,972, filed on Dec. 12, 2003.

(51) Int. Cl.
*A01K 29/00* (2006.01)

(52) U.S. Cl. .......................... 426/2; 426/383; 426/805; 119/709; 119/710; 119/711

(58) Field of Classification Search .................. 426/92, 426/104, 805, 2, 383; 119/709, 710, 711; D21/398; D30/160
See application file for complete search history.

(56) References Cited

U.S. PATENT DOCUMENTS

| | | | | | |
|---|---|---|---|---|---|
| 3,498,793 | A | * | 3/1970 | Dechaine et al. | ............ 426/274 |
| 3,871,334 | A | * | 3/1975 | Axelrod | ...................... 119/710 |
| 3,899,607 | A | * | 8/1975 | Miller et al. | ................. 426/285 |
| 3,965,268 | A | * | 6/1976 | Stocker et al. | .............. 426/331 |
| 4,119,022 | A | * | 10/1978 | Dykes et al. | ................... 99/532 |
| 4,260,635 | A | * | 4/1981 | Fisher | ............................ 426/3 |
| 5,174,243 | A | * | 12/1992 | O'Rourke | ................... 119/709 |
| D374,748 | S | * | 10/1996 | Plunk | ........................ D30/160 |
| D433,778 | S | * | 11/2000 | Axelrod | ..................... D30/160 |
| 6,186,096 | B1 | * | 2/2001 | Miller | ......................... 119/709 |
| 6,202,598 | B1 | * | 3/2001 | Willinger | ..................... 119/709 |
| 6,238,715 | B1 | * | 5/2001 | Baikie | .......................... 426/92 |
| 6,305,326 | B1 | * | 10/2001 | Suchowski et al. | .......... 119/709 |
| 6,672,252 | B2 | * | 1/2004 | Levin et al. | ................. 119/709 |
| 6,896,924 | B2 | * | 5/2005 | Hernandez et al. | .......... 426/623 |

\* cited by examiner

*Primary Examiner*—C. Sayala
(74) *Attorney, Agent, or Firm*—John D. Gugliotta

(57) ABSTRACT

A chew toy has a bone portion impregnated with a soft solid along an interior thereof to simulate the taste and texture of bone marrow, and has a meat portion impregnated with liquid to simulate the taste of meat. The bone portion is defined by an elongated shaft terminating at opposite ends. A first terminal end and a second terminal end of the shaft are defined by a pair of condyles, or in the alternative, by a rounded body. The elongated shaft is defined by a narrow middle portion and widening at a first terminal end and a second terminal end. The meat portion circumscribes a terminal end the bone portion. The meat portion further extends toward a middle portion of a shaft of the bone portion, wherein a sufficient quantity of the bone portion is available for use by a canine.

14 Claims, 2 Drawing Sheets

APPARATUS AND METHOD OF MAKING CANINE CHEW TOY

RELATED APPLICATIONS

This application claims the benefit of U.S. Provisional Application No. 60/528,972, filed on Dec. 12, 2003.

BACKGROUND OF THE INVENTION

1. Field of the Invention

The present invention is generally directed to a canine chew toy, and more particularly, is directed to an apparatus and method of making a canine chew toy comprising a bone portion and a meat portion.

2. Description of the Related Art

There are numerous chew toys available in a variety of forms and sizes. However, the present invention provides a canine chew toy comprising a bone portion and a meat portion, the bone portion fabricated from a hard substance and the meat portion fabricated from a relatively softer substance. The dual substance fabrication of the chew toy better simulates a bone and meat combination a canine might be attracted to, such as a chicken leg, a turkey leg or a ham bone. Furthermore, the dual substance fabrication of the chew toy provides contrasting textures for a canine to chew, thereby stimulating muscle growth and strength in the jaw and neck muscles and contributing to the overall dental health by aiding in removal of excess plaque and strengthening the teeth through exercise. Finally, the canine chew toy may be impregnated with a liquid (juice) substance to simulate the natural liquid and/or juice found in a bone and meat product. The canine chew toy may also be impregnated with a soft interior simulating the marrow of an animal bone. To the applicant's knowledge, there are no canine chew toys available that provide the aforementioned advantages and overcome the problems, deficiencies and disadvantages associated with commonly available canine chew toys.

Consequently, there exists a continuous need for new ideas and enhancements for existing products in the pet chew toy industry.

SUMMARY OF THE INVENTION

In one exemplary embodiment of the present invention, a chew toy is disclosed as having a bone portion impregnated with a soft solid along an interior thereof to simulate the taste and texture of bone marrow, and a meat portion impregnated with liquid to simulate the taste of meat. The bone portion is defined by an elongated shaft terminating at opposite ends. The opposite ends are further defined as a first terminal end opposite a second terminal end. The first terminal end and the second terminal end are defined by a pair of condyles, or in the alternative, by a rounded body. The bone portion comprises an elongated shaft defined by a narrow middle portion and widening at a first terminal end and a second terminal end. The meat portion circumscribes a terminal end the bone portion. The meat portion further extends toward a middle portion of a shaft of the bone portion, wherein a sufficient quantity of the bone portion is available for use by a canine.

In an exemplary embodiment disclosing a method of making or manufacturing the chew toy apparatus, the method of making a canine chew toy, wherein the chew toy has a bone portion and a meat portion, the method of making comprises the steps of molding of the bone portion, and molding of the meat portion. The meat portion is directly molded onto the bone portion. The bone portion is inserted into a recess formed at a tail portion of the meat portion. The bone portion is impregnated with a soft solid along an interior thereof for simulating the taste and texture of bone marrow. The meat portion is impregnated with liquid for simulating the taste of meat.

It is therefore an object of the present invention to provide an improved chew toy for a pet.

It is therefore another object of the present invention to provide an improved chew toy having a meat portion and a bone portion, wherein the meat portion is impregnated with liquid to simulated the taste of meat, and wherein the bone portion is impregnated with a soft solid to simulate the taste of bone and bone marrow.

It is therefore another object of the present invention to provide a method for making an improved chew toy, wherein impregnation of the liquid and solid are performed during the molding process.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within FIGS. 1 through 5.

1. Detailed Description of the Figures

Figure 1:
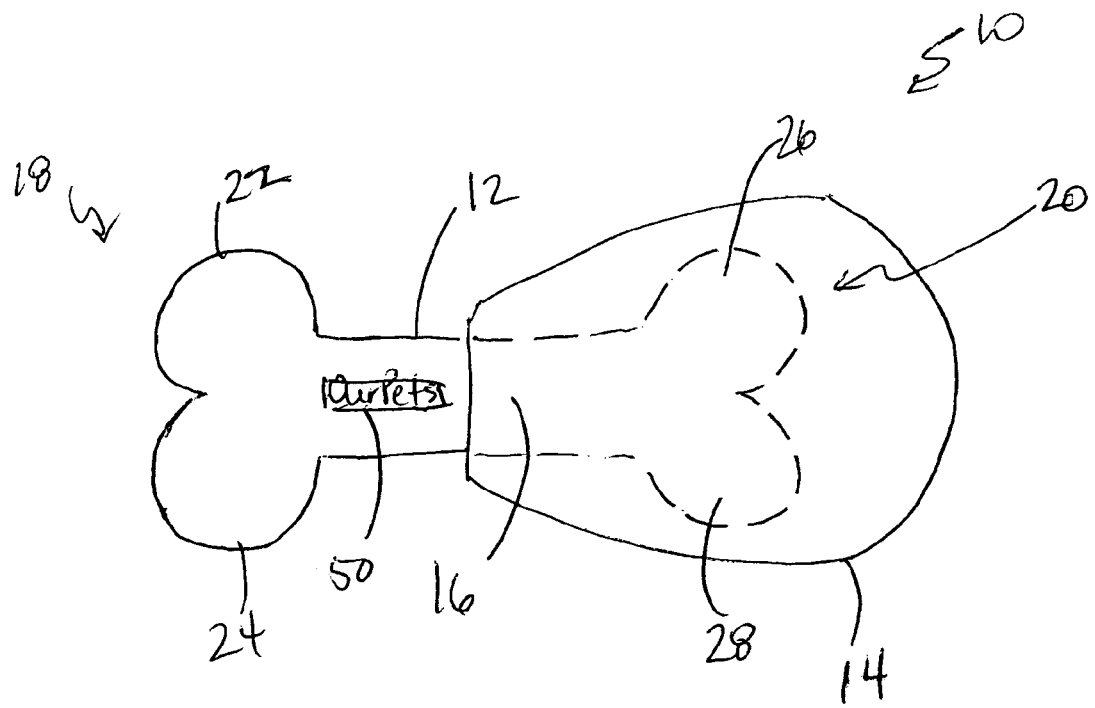
FIG. 1 is a top view of one embodiment of a canine chew toy.
Figure 2:
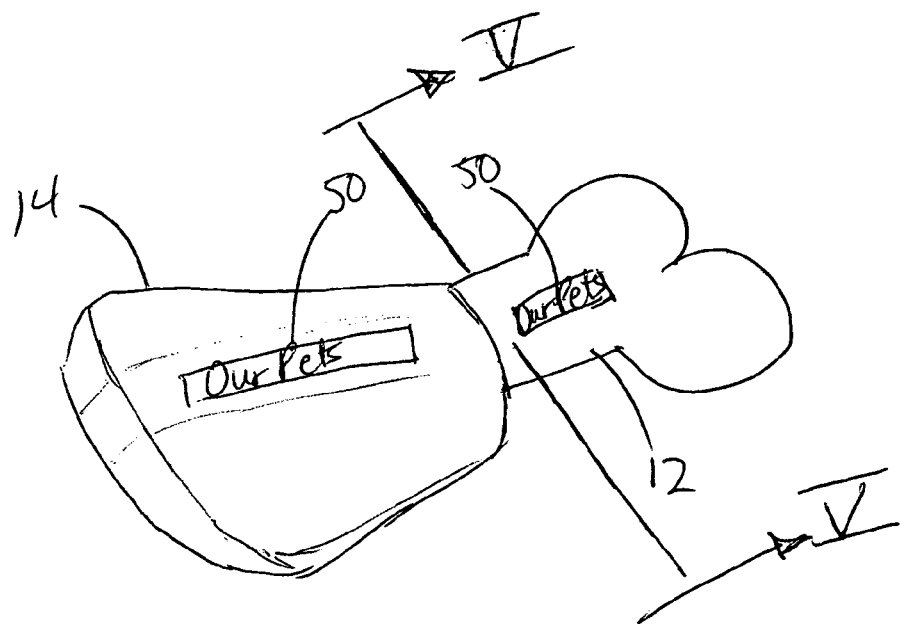
FIG. 2 is a perspective view of the canine chew toy.
Figure 3:
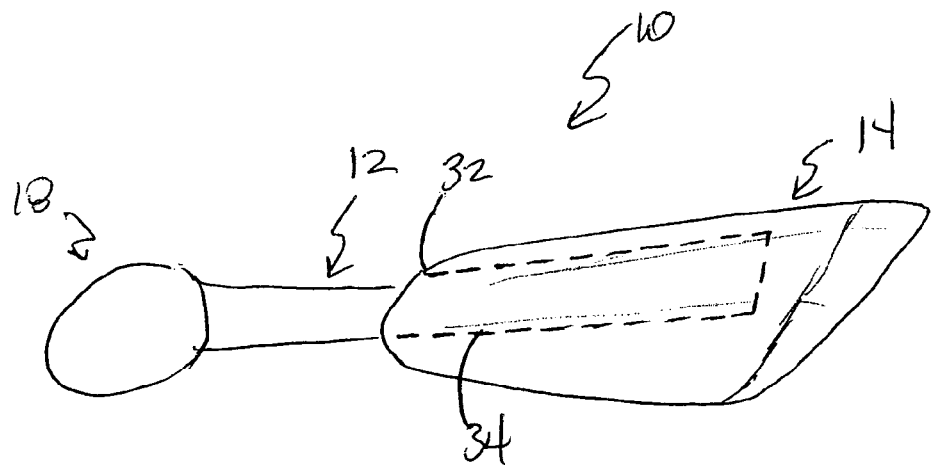
FIG. 3 is a side perspective view of the canine chew toy.

Referring now to FIG. 1 through FIG. 3, a canine chew toy (hereinafter "toy") 10 is shown in accordance with a preferred embodiment of the present invention. The toy 10 comprises a bone portion 12 and a meat portion 14.

Figure 4:
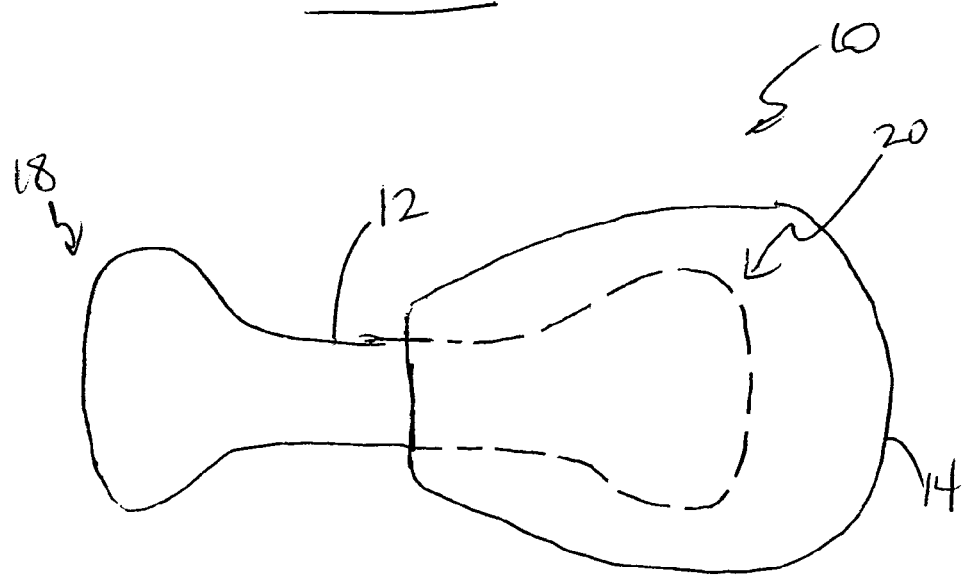
FIG. 4 is a top view of an alternate embodiment of the canine chew toy.
Figure 5:
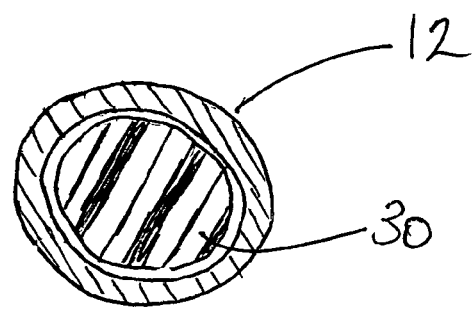
FIG. 5 is a cross-sectional view of the bone portion 12 (and shaft 16) taken along line V-V of FIG. 2, illustrating the soft interior 30 provided along the interior of bone portion 12.

The bone portion 12 is defined by an elongated shaft 16 terminating at opposite ends 18 and 20, ends 18 and 20 further defined as a first terminal end 18 and a second terminal end 20. The bone portion 12 is envisioned as having a variety of lengths and shapes. In the embodiments depicted by FIG. 1 through FIG. 3, the bone portion 12 is shown as an exaggeration of commonly recognizable bone shapes, comprising a substantially linearly elongated shaft 16 with the first terminal end 18 and the second terminal end 20 forming a pair of condyles 22 and 24 (at end 18) and a pair of condyles 26 and 28 (at end 20) that is representative of a mammalian femoral bone. However, other embodiments of the bone portion 12 are envisioned, including an elongated shaft 16 terminating at ends 18 and 20 defined by a generally rounded body (representative of a mammalian ball and socket joint, the body representative of the ball portion enervating with the socket of the joint). In this embodiment, as depicted in FIG. 4, the shaft 16 is envisioned as having a narrow or tapered middle portion and gradually widening along the linear length of the shaft 16 toward the ends 18 and 20.

The meat portion 14 circumscribes a terminal end 18 or 20 of the bone portion 12. As depicted in FIG. 1 through FIG. 3, the meat portion 14 circumscribes at least a terminal end 18 and 20, and further extends toward a middle portion of the shaft 16. It is envisioned that the meat portion 14 may substantially circumscribe the bone portion 12, provided that a sufficient quantity of the bone portion 12 (and terminal end 18 or 20 that is not circumscribed by meat portion 14) is available for use by a canine.

It is also envisioned that indicia 50 may be provided on the bone portion 12 or the meat portion 14 separately, or indicia 50 may be provided on each portion 12 and 14 simultaneously. The indicia 50 are envisioned as comprising raised letters or figures. The raised indicia 50 provides an additional means by which a canine my remove plaque and/or excess food particles from the teeth and further strengthen the teeth, gums, jaw and neck. The indicia 50 may have a variety of colors and font styles, thus operating as a visual attractant to the pet.

Fabrication of the toy 10 is envisioned as comprising a two step molding process, wherein the bone portion 12 and the meat portion 14 are separately fabricated from plastic or rubber materials, or a combination or composite thereof. In one envisioned embodiment, the bone portion 12 is fabricated from a material relatively harder than the material used for fabricating the meat portion 14 (conversely, the meat portion 14 is fabricated from a softer material relative to the bone portion 12). The dual substance fabrication of the chew toy better simulates a bone and meat combination a canine might be attracted to, such as a chicken leg, a turkey leg or a ham bone. Furthermore, the dual substance fabrication of the chew toy provides contrasting textures for a canine to chew, thereby stimulating muscle growth and strength in the jaw and neck muscles, and contributing to the overall dental health by aiding in removal of excess plaque and strengthening the teeth through exercise. It is intended that the material used to fabricate the toy 10 is deformable and returnable resilient.

During the fabrication processes, it is further envisioned that the bone portion 12 may be impregnated with a soft solid 30 within an internal volume along a portion of or the entire length of the bone portion, thereby simulating the taste and texture of mammalian bone marrow when exposed. It is further envisioned that the meat portion 14 may be impregnated with a liquid (juice) substance (not shown in figures) simulating the moistness and taste of a bone and meat combination appealing to a canine (such as a chicken leg, a turkey leg and/or a ham bone). The solid 30 and liquid are envisioned as comprising a variety of flavors and/or characteristics, including sweet or salt characteristics, and any flavors along the sweet spectrum generally appealing to canines. The toy 10 is envisioned as having an embodiment that are absent impregnation of the substances described above, as having an embodiment possessing impregnation of the solid 30 or the liquid, or as having an embodiment possessing impregnation of the solid 30 and the liquid.

In one envisioned fabrication method, the bone portion 12 is fabricated by an industrial molding process, and subsequent to an appropriate curing period, the meat portion 14 is fabricated by an industrial molding process directly onto an end 18 or 20 of the bone portion 12. In another envisioned fabrication method, the bone portion 12 is fabricated by an industrial molding process. The meat portion 14 is then fabricated from an industrial molding process. After an appropriate curing time for each portion 12 and 14, the bone portion 12 may be inserted into a recess 34 provided at a tail portion 32 (as shown in FIG. 3) of the meat portion 14, insertion accomplished by machine or by manual actuation.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention is a chew toy 10 for a pet having a bone portion 12 and a meat portion 14 upon which the pet may chew. The bone portion 12 and meat portion 14 release flavor impregnated within as the pet chews, the bone portion releasing flavor from a soft solid core and the meat portion releasing liquid flavor impregnated into the meat portion. The pet can strengthen its jaws, improve dental hygiene, and have physical and mental stimulus as a result of using the pet chew toy 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A chew toy comprising:
    a bone portion formed of a non-consumable material impregnated with a soft solid along an interior thereof to simulate a taste and a texture of bone marrow; and
    a meat portion circumscribing a part of said bone portion, said meat portion is formed of a softer non-consumable material impregnated with liquid to simulate the taste of meat.

2. The chew toy of claim 1, wherein said bone portion is defined by an elongated shaft having a first terminal end opposite a second terminal end.

3. The chew toy of claim 2, wherein said first terminal end and said second terminal end are defined by a pair of condyles.

4. The chew toy of claim 2, wherein said first terminal end and said second terminal end are defined by a rounded body.

5. The chew toy of claim 1, wherein said bone portion comprises a linearly elongated shaft.

6. The chew toy of claim 1, wherein said bone portion comprises an elongated shaft defined by a narrow middle portion and a widening at a first terminal end and a second terminal end.

7. The chew toy of claim 1, wherein said part of said bone portion that said meat portion circumscribes is a first of two terminal ends.

8. The chew toy of claim 7, wherein said meat portion further extends toward a middle portion of a shaft of said bone portion, wherein a sufficient quantity of said bone portion is available for use by a canine.

9. A method of making a canine chew toy, said method comprises the steps:
- a molding of an elongated bone portion formed of a non-consumable plastic material; and
- a molding of a meat portion directly onto a terminal end and part of a length of said bone portion, said meat portion is formed of a softer, non-consumable plastic or rubber material.

10. The method of claim 9, wherein said bone portion is inserted in a recess formed at a tail portion of said meat portion.

11. The method of claim 9, wherein said bone portion is impregnated with a soft solid along an interior thereof to simulate a taste and a texture of bone marrow.

12. The method of claim 9, wherein said meat portion is impregnated with a liquid to simulate a taste of meat.

13. A chew toy comprising:
- a bone portion defined by an elongated shaft having a first end and a second end, said bone portion is formed from a non-consumable plastic;
- a soft solid impregnated within an interior of said bone portion, said soft solid simulates a texture and a taste of bone marrow;
- a meat portion molded around said first end and a part of a length of said elongated shaft, said meat portion is formed from a softer, non-consumable material that is deformable and returnably resilient so as to simulate a texture and an appearance of meat; and,
- a liquid substance impregnated within said meat portion, said liquid substance is provided as a means to simulate a moistness, a scent and a flavor of a meat product.

14. The chew toy of claim 13 further comprising a raised indicia on the exterior of said bone portion.

* * * * *